(12) United States Patent
Stevens (10) Patent No.: US 7,857,345 B1
(45) Date of Patent: Dec. 28, 2010

(54) VALVE ASSEMBLY FOR GAS GENERATING SYSTEM

(75) Inventor: Bruce A. Stevens, Oakland, MI (US)

(73) Assignee: TK Holdings, Inc., Armada, MI (US)

( * ) Notice: Subject to any disclaimer, the term of this patent is extended or adjusted under 35 U.S.C. 154(b) by 0 days.

(21) Appl. No.: 12/217,646

(22) Filed: Jul. 7, 2008

Related U.S. Application Data (60) Provisional application No. 60/958,510, filed on Jul. 6, 2007.

(51) Int. Cl.
*B60R 21/26* (2006.01)
(52) U.S. Cl. ..................................... 280/736
(58) Field of Classification Search ................. 280/736, 280/737
See application file for complete search history.

(56) References Cited

U.S. PATENT DOCUMENTS

| | | | | |
|---|---|---|---|---|
| 3,774,807 A * | 11/1973 | Keathley et al. | ................ | 222/3 |
| 3,810,655 A | 5/1974 | Prachar | ...................... | 280/150 |
| 4,494,963 A | 1/1985 | Reich | ............................ | 48/69 |
| 5,487,561 A | 1/1996 | Mandzy et al. | ............. | 280/741 |
| 5,649,720 A | 7/1997 | Rink et al. | .................. | 280/737 |
| 5,806,886 A | 9/1998 | Ittel et al. | .................... | 280/741 |
| 6,051,158 A | 4/2000 | Taylor et al. | .................. | 252/67 |
| 6,076,468 A | 6/2000 | DiGiacomo et al. | ......... | 102/530 |
| 6,196,583 B1 | 3/2001 | Ruckdeschel et al. | ....... | 280/736 |
| 6,231,702 B1 | 5/2001 | Blomquist | .................... | 149/36 |
| 6,932,383 B2 | 8/2005 | Flamm | ........................ | 280/737 |
| 7,073,820 B2 | 7/2006 | McCormick | ................. | 280/741 |
| 7,134,690 B2 | 11/2006 | Furusawa et al. | ........... | 280/736 |
| 7,178,831 B2 | 2/2007 | Yoshida et al. | | |
| 7,588,265 B2 | 9/2009 | Blackburn | ................... | 280/737 |
| 7,597,354 B2 | 10/2009 | Blackburn | ................... | 280/737 |
| 2004/0041380 A1 * | 3/2004 | Jung et al. | ................... | 280/736 |

OTHER PUBLICATIONS

U.S. Appl. No. 12/150,401 (177).
U.S. Appl. No. 12/321,537 (192).
U.S. Appl. No. 12/156,611 (186).
Office Action U.S. Appl. No. 12/150,401, filed Apr. 28, 2008, Dated May 19, 2010 (177).
Office Action U.S. Appl. No. 12/150,401, filed Apr. 28, 2008; Mailed Jul. 27, 2010 (177).

* cited by examiner

*Primary Examiner*—Faye M. Fleming
(74) *Attorney, Agent, or Firm*—L.C. Begin & Associates, PLLC (57) ABSTRACT

A gas generating system includes a housing having a passage, a forcing member positioned in the passage, and a flowable material positioned in the passage to resist motion of the forcing member. The flowable material flows out of the housing responsive to a force exerted on the forcing member by a gas.

10 Claims, 6 Drawing Sheets

VALVE ASSEMBLY FOR GAS GENERATING SYSTEM

CROSS-REFERENCE TO RELATED APPLICATIONS

This application claims the benefit of provisional application Ser. No. 60/958,510 filed on Jul. 6, 2007.

BACKGROUND OF THE INVENTION

The present invention relates generally to gas generating systems incorporating mechanisms for regulating a flow of gas from the system.

SUMMARY OF THE INVENTION

In one aspect, a gas generating system is provided including a housing having a passage, a forcing member positioned in the passage, and a flowable material positioned in the passage to resist motion of the forcing member. The flowable material flows out of the housing responsive to a force exerted on the forcing member by a gas.

In another aspect, a gas generating system is provided including a gas source and a valve assembly for regulating a gas flow from the gas source. The valve assembly includes a housing having a passage and at least one gas exit opening formed in the housing along the passage to enable fluid communication between the passage and an exterior of the housing. The housing is coupled to the gas source so as to enable fluid communication between the gas source and the passage. A forcing member is positioned in the passage to form a cavity between the forcing member and the housing and to at least partially block a flow of gas through the at least one gas exit opening. The forcing member is movable along the passage responsive to a flow of gas from the gas source. A flowable material is positioned in the cavity to resist motion of the forcing member responsive to the flow of gas. A seal is formed between the housing and the forcing member to prevent flow of flowable material out of the cavity.

In another aspect, a gas generating system is provided including a housing defining a passage, a frangible seal coupled to the housing and adapted to prevent a flow of gas along the passage, and a flowable material positioned in the passage. Means is provided for fracturing the seal to form a first seal portion and a second seal portion, thereby releasing gas into the passage. The released gas exerts a force on the second seal portion which is transmitted, via the second seal portion, to the flowable material to force the flowable material to flow out of the housing.

DETAILED DESCRIPTION

Figure 1:
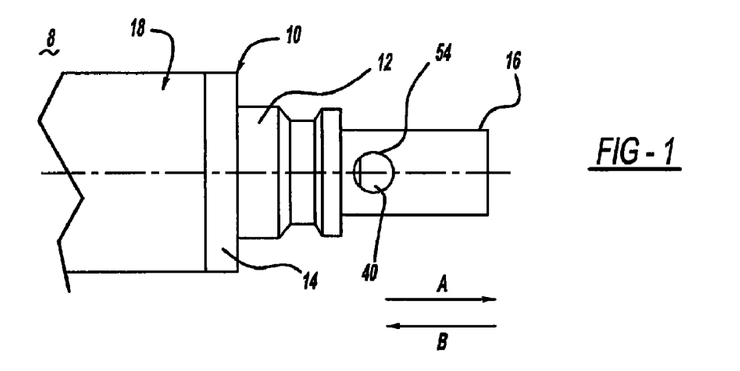
FIGS. 1-10 show the structure and operation of a gas generating system incorporating a valve assembly in accordance with a first embodiment of the present invention.
Figure 2:
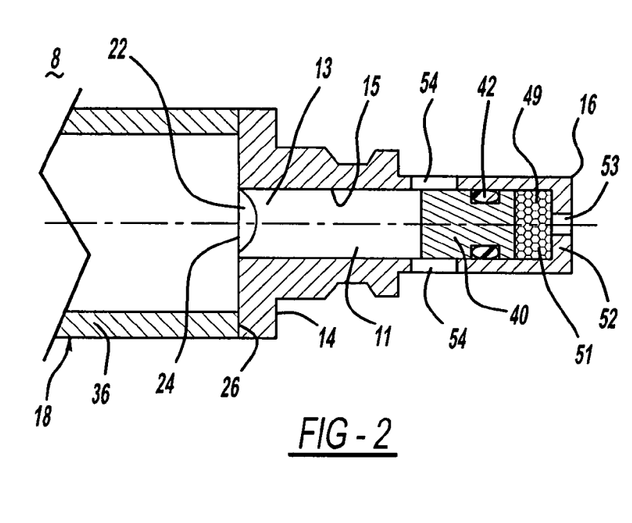
Figure 3:
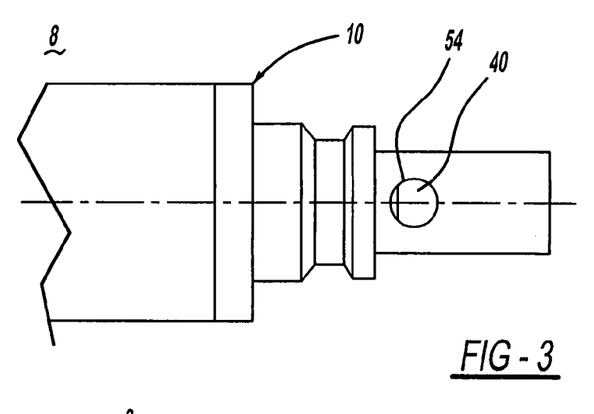
Figure 4:
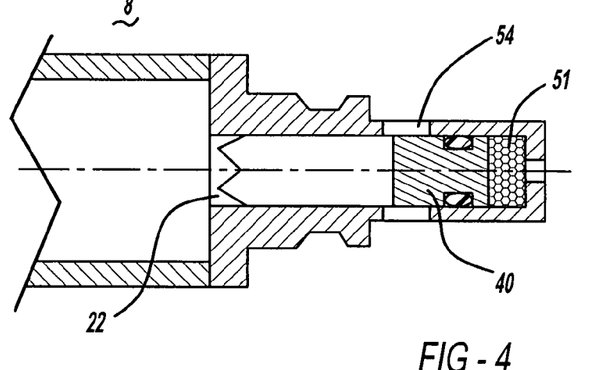
Figure 5:
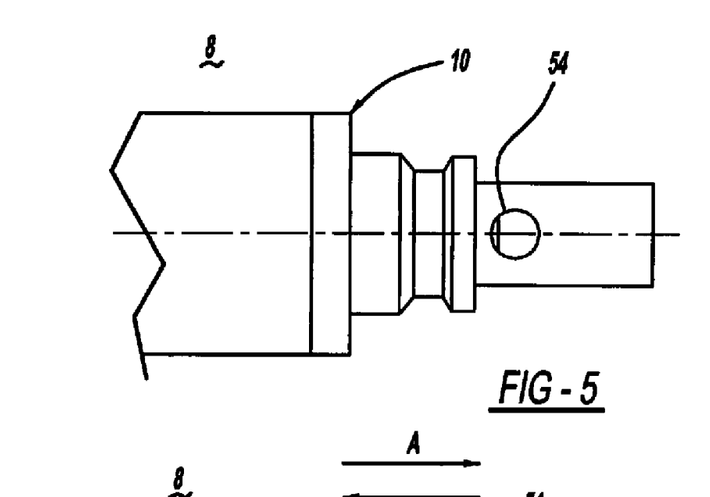

FIGS. 1-10 show the structure and operation of embodiments of a gas generating system 8 incorporating a valve assembly 10 for moderating or attenuating a release of fluid from a container upon activation of the gas generating system. Referring to FIGS. 1-2, valve assembly 10 is shown secured to a gas source, such as a gas bottle or tank 18 in which a fluid (in this case, an inflation gas) is stored. Bottle 18 has an annular wall 36 with an edge 26 defining a bottle opening 24.

A rupturable membrane 22 (for example, a burst disk) is secured in fluid communication with an interior of bottle 18. Membrane 22 forms a fluid-tight barrier preventing flow of gas through or around the membrane. In the embodiment shown in FIGS. 1-2, membrane 22 is seated along an edge of an opening 13 formed in a housing 12 (described in greater detail below) containing the elements of the valve assembly. Membrane 22 is welded or otherwise secured over opening 13 to obstruct flow of the fluid during normal vehicular operation.

Membrane 22 may be stamped or formed from any of various disks, foils, films, etc., as is known in the art. The materials and structure of the membrane will depend on the pressure range in which the membrane is intended to rupture, the desired performance characteristics of gas generating system 8, and other factors. For example, disks made from materials and/or having structures which are relatively more or less readily ruptured may be used.

Housing 12 defines a passage 11 for receiving the fluid therethrough and terminating in an endwall 52. Housing 12 is coupled to the gas source so as to enable fluid communication between the gas source and passage 11. Passage 11 is dimensioned so as to support and enable movement of a forcing member 40 (described below) therealong, in response to pressure from a flow of gas emanating from bottle 18 upon activation of the gas generating system.

An opening 53 is formed endwall 52 to provide egress for a flowable material 51 stored in a passage second portion or cavity 49 (described below) formed between forcing member 40 and endwall 52. A tape seal or other known seal (not shown) may be secured over opening 53 and is structured to open or otherwise fail under pressure exerted by flowable material 51, thereby enabling the flowable material to flow through opening 53 as forcing member 40 exerts pressure on the flowable material. The seal may be similar to membrane 22 previously described.

A plurality of gas discharge orifices 54 is formed in the housing to enable fluid communication between an interior of the housing and an exterior of the housing. The embodiment shown in FIGS. 1-2 includes four gas discharge orifices 54 substantially evenly spaced about the circumference of an end of the housing. Housing 12 may be cast, machined, or otherwise formed from a metal, metal alloy, or other suitable material.

The housing may incorporate a filter (not shown) therein to filter combustion products from the inflation fluid prior to gas distribution. Any suitable metallic mesh filter or woven wire cloth may be used, many examples of which are known and obtainable from commercially available sources (for example, Wayne Wire Cloth Products, Inc. of Bloomfield Hills, Mich.) Housing 12 is fabricated (for example, by machining, casting, or some other suitable process) from a rigid material such as carbon steel or stainless steel. Other suitable types or designs of filters may also be used.

Forcing member 40 is positioned within passage 11 so as to slidably move along the passage under the influence of gas from the gas source. A seal 42 (for example, an O-ring seal) is secured along an outer surface of the forcing member (for example, in a groove as shown in FIG. 2) so as to seal the interface between forcing member 40 and the housing interior wall.

In the embodiments shown in FIGS. 1-10, forcing member 40 and seal 42 divide passage 11 into a first portion or cavity 49 and a second portion 11b. Seal 42 is structured to prevent the flow of flowable material 51 (described below) from cavity 49 between housing 12 and forcing member 40. Seal 42 is also structured to prevent flow of flowable material out of passage first portion 49, to passage second portion 11b, both prior to and during deployment of the gas generating system. In the embodiment shown in FIGS. 1-10, the flow of gas is in direction "A" and seal 42 is designed to prevent a flow of flowable material in a direction "B" substantially opposite direction "A". In the embodiment shown in FIGS. 1-10, seal 42 is configured to slide freely within passage 11 along the housing interior wall, in conjunction with forcing member 40. In an alternative embodiment (not shown), the seal 42 is secured along a wall of housing 12 or is otherwise secured within the housing such that the seal does not move in conjunction with the forcing member. Various alternative types of seals or gaskets may be employed provided the alternative seals form a suitable seal that is forcing in conjunction with forcing member 40.

Forcing member 40 may be cast, stamped, extruded, or otherwise metal-formed. Alternatively, forcing member 40 may be molded from a suitable high-temperature resistant polymer or otherwise formed from another suitable material. In a particular embodiment, the design of forcing member 40 and the material from which the forcing member is formed are selected to minimize the mass of the forcing member. It is believed that this reduces the static and dynamic inertia of the forcing member during actuation, thereby enhancing the responsiveness of the valve assembly described herein. Conversely, a forcing member having a relatively greater mass may be provided to delay or attenuate motion of the forcing member responsive to the increased pressure within the housing, thereby affecting the rate at which orifices 54 open (as described below) and, consequently, affecting the inflation profile of a gas-actuatable device operatively coupled to the gas generating system. In another particular embodiment, the forcing member is formed from a thermally conductive material and has a relatively small dimension in the direction of flow of gas, or is otherwise structured so as to facilitate rapid conduction of heat from the gas through the forcing member to the flowable material.

The flowable material 51 is positioned in the cavity 49 to resist motion of forcing member 40 in the direction indicated by arrow "A" (see FIG. 2). The flowable material 51 in cavity 49 may be any material (for example, a gas, liquid, gelatinous substance, powder, etc.) containable in the cavity and capable of flowing out of endwall opening 53 under pressure exerted by forcing member 40. As used herein the term "flowable material" is understood to mean a substance that at least partially conforms to the shape of a container or confinement in which the substance is placed after being placed in the confinement, and that is capable of flowing.

The composition and other characteristics of the flowable material may be specified such that the material, either alone, in conjunction with, or in response to other features or operating parameters of the system, facilitates the attainment of a desired inflation profile of a gas-actuated device operatively coupled to the gas generating system. For example, a shear-thinning material such as a pseudoplastic material, a thixotropic material, or a Bingham Plastic material may be specified. As used herein, a pseudoplastic material is defined as a material whose viscosity decreases relatively rapidly under an applied shear stress and then remains relatively constant under continued application of the stress. As used herein, a thixotropic material is defined as a material whose viscosity decreases under an applied shear stress and then continues to decrease under continued application of the stress. As used herein, a Bingham plastic material is defined as a material whose viscosity decreases only after a shear stress applied to the material exceeds a minimum predetermined yield value.

In one example, where a pseudoplastic material is used for the flowable material, it is believed that a forcing member pushing against the flowable material in response to gas pressure would exhibit a relatively rapid initial movement in direction "A" corresponding to an initial decrease in material viscosity, breakage of any seal positioned over opening 53, and initial flow of the flowable material out of opening 53. After this initial motion, it is believed that motion of the forcing member in response to the gas pressure would be relatively slower and relatively constant. In the manner described below, gas exit opening(s) will open in correspondence with this motion of the forcing member, thereby producing a corresponding inflation profile in an inflatable device coupled to the gas generating system. In such a manner, the characteristics of the flowable material influence the gas generating system inflation profile.

In a particular embodiment of the invention, the viscosity of the flowable material 51 varies inversely with its temperature, and heat is conducted through the forcing member to elevate the temperature of the flowable material in the cavity, thereby reducing its viscosity. Alternatively, a flowable material may be specified which exhibits relatively little change in viscosity under pressure and/or over the temperature range experienced by the interior of housing 12 during operation of the gas generating system. By affecting the viscosity of the flowable material, the ease with which the material will flow out of opening 53 is correspondingly affected. Thus, by appropriate specification of the flowable material, the resistance to movement of forcing member 40 and, consequently, the speed at which openings 54 are uncovered may be controlled as desired. Examples of flowable materials suitable for use in the embodiments of the present invention are KE1052 or X832 curable silicone gels manufactured by Shin-Etsu Silicones of America, of Akron, Ohio.

Figure 1A:
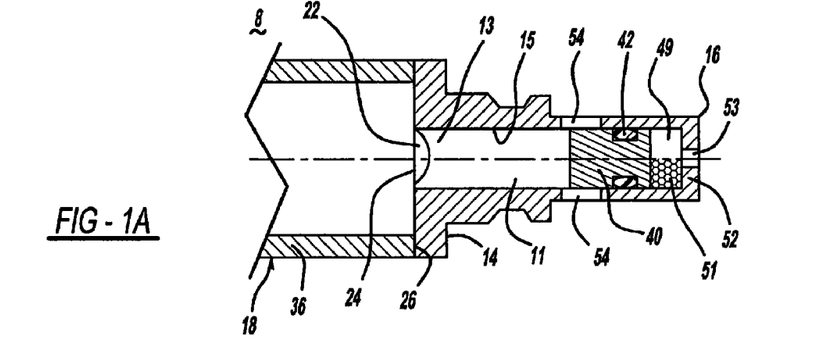

Referring to FIG. 1A, in another particular embodiment of the invention, the flowable material does not occupy the entire volume of passage first portion 49. That is, the passage first portion or cavity 49 has a first volume V1 prior to activation of the gas generating system, and the flowable material 51 occupies a second volume V2 that is less than the first volume.

It will be appreciated that design considerations such as the bottle internal fluid pressure, the tightness of the seal between the forcing member and housing wall 15, the area of the forcing member acted upon by the released gas, the size of opening 53, the mass of forcing member 40, the viscosity, composition, compressibility, and other characteristics of the flowable material in cavity 49, the temperature of the gas flowing through passage 11, the amount of flowable material in cavity 49, the number, sizes, and arrangement of openings 54, the distance that the forcing member must travel in order to uncover the gas exit openings, and other parameters may be iteratively harmonized to provide a total open area of gas exit orifices 54 which gradually increases at a predetermined rate upon activation of the gas generating system, thereby correspondingly achieving a desired initial rate of gas release from housing 12. As such, when properly informed with system performance requirements and data (typically developed in gas generating system design and manufacture) relating to the interactions between these and other design considerations, the actual dimensions and parameters of the system for any particular application may be appropriately and iteratively selected to result in a system that provides an initial gas release having a mass and pressure within desired predetermined ranges. In sum, the dimensions of the system elements described above and the effects of other design variables as known in the art may be either singularly or jointly evaluated on a trial and error basis for their effects on performance characteristics of the gas generating system.

Operation of mechanism 10 will now be discussed.

Figure 6:
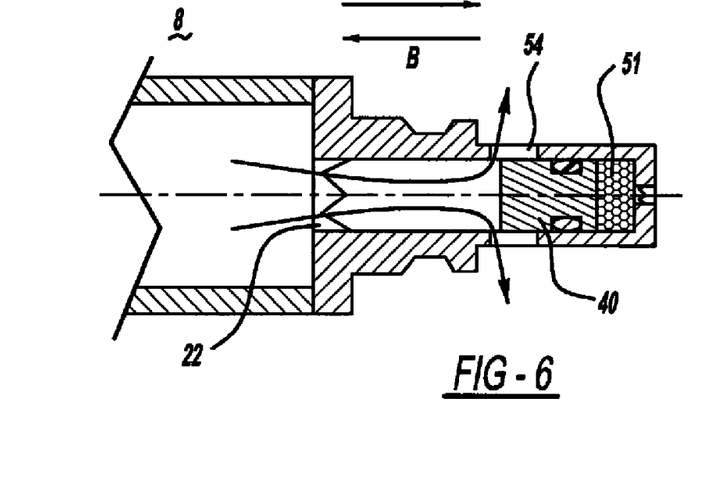
Figure 7:
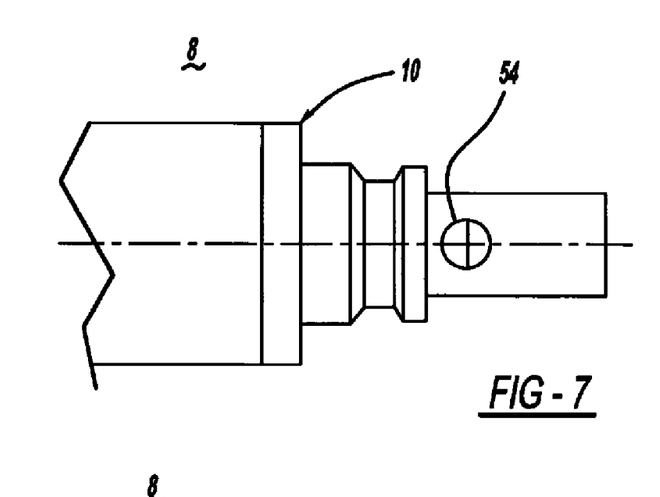
Figure 8:
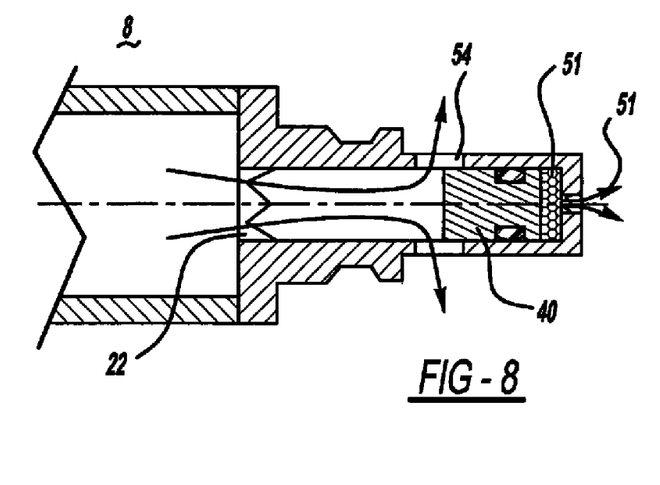
Figure 9:
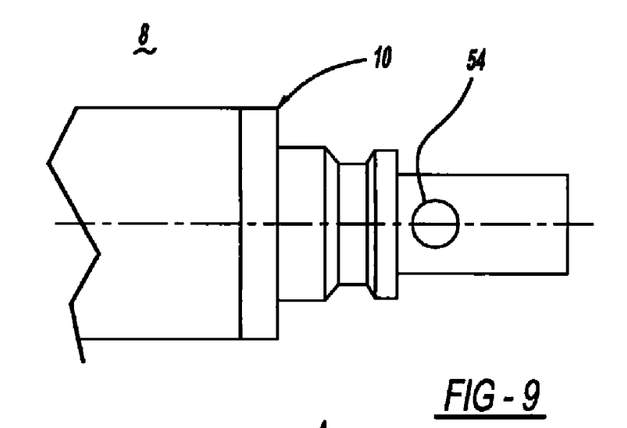
Figure 10:
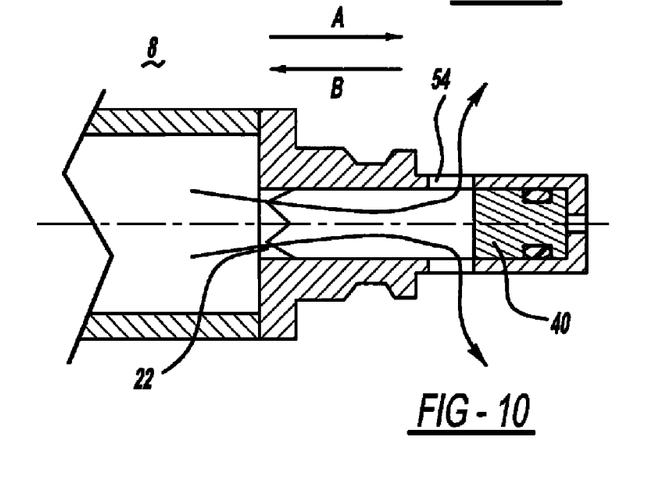
Figure 11:
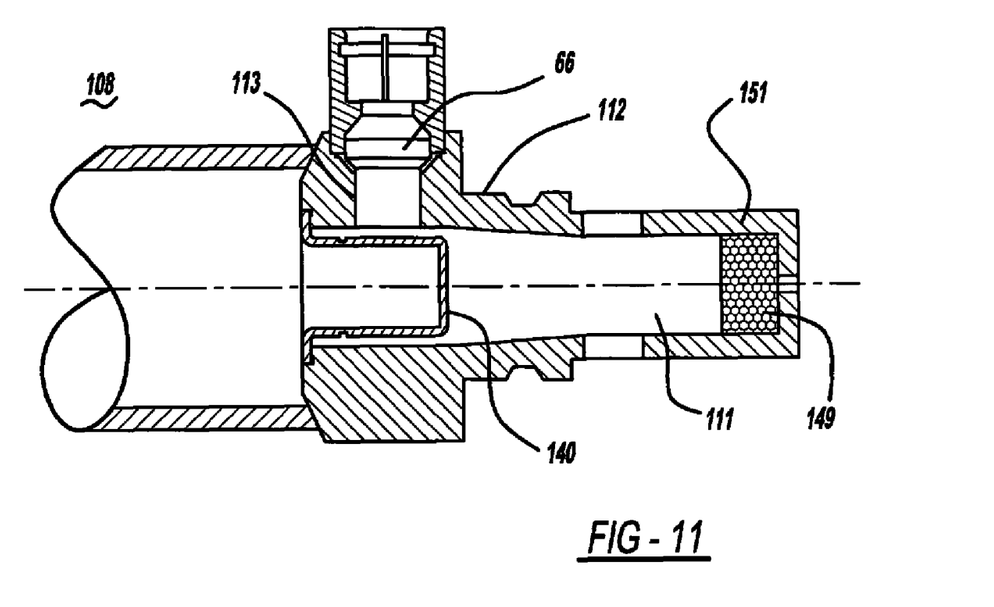
FIGS. 11-14 show the structure and operation of a valve assembly in accordance with a second embodiment of the present invention.
Figure 12:
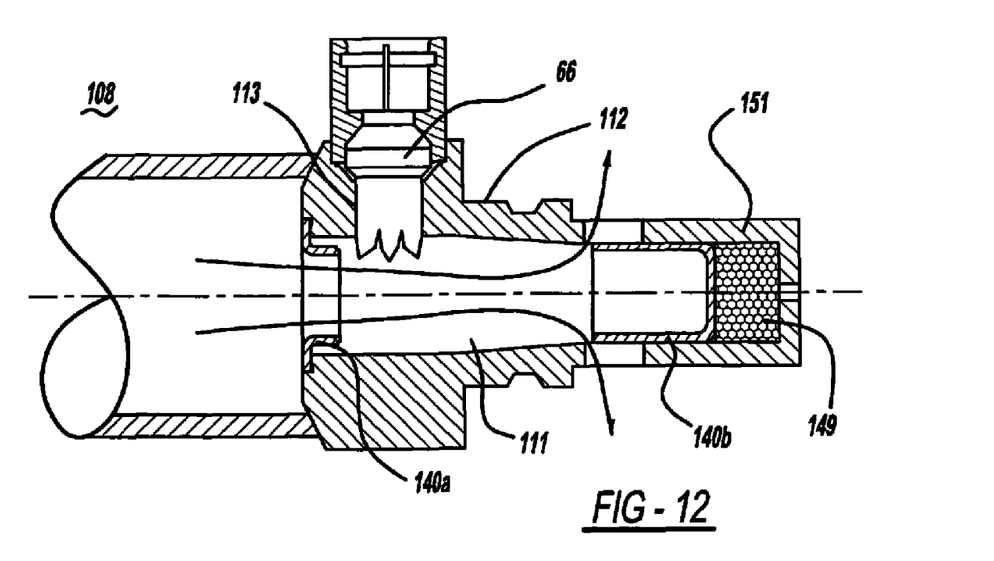
Figure 13:
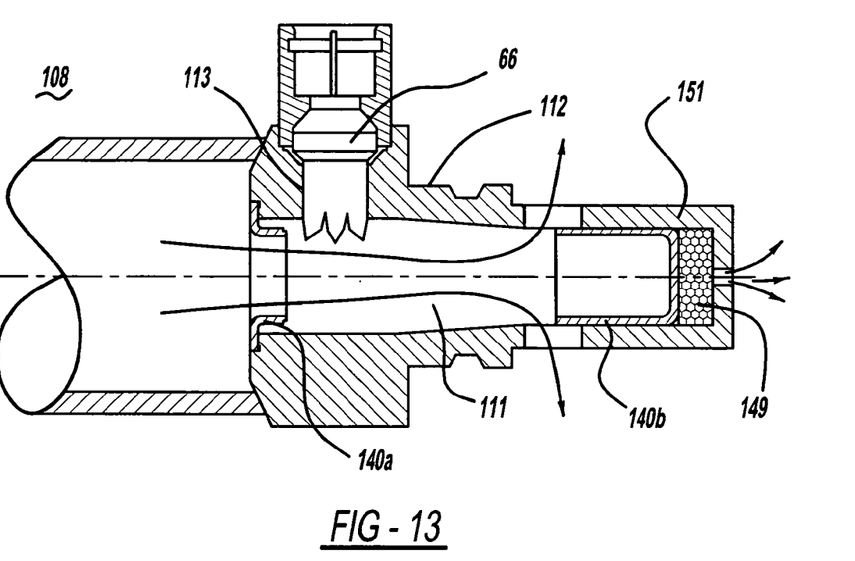
Figure 14:
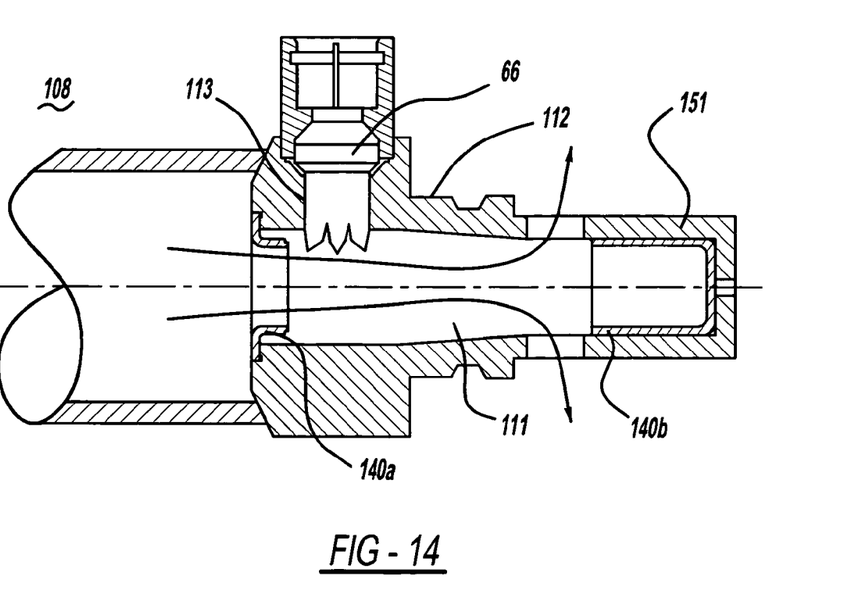

FIGS. 3-10 are cross-sectional, interior views (FIGS. 2, 4, 6, 8, and 10) and respective exterior views (FIGS. 1, 3, 5, 7, and 9) of the valve mechanism, showing operation of the mechanism in progression from the bursting of membrane 22 (FIG. 4) through subsequent movement of forcing member 40 along passage 11 in direction "A", as the forcing member pushes against flowable material 51 to expel the material (as seen in FIGS. 6, 8, and 10) from housing 12.

Referring to FIGS. 3-10, upon a crash event, a signal from a crash sensor or accelerometer (not shown), for example, activates the gas generating system. Upon system activation, the pressure of the gas stored in bottle 18 is increased by heating or other means, to burst membrane 22 (see FIGS. 3 and 4). Alternatively, any of a variety of other known methods may be employed to burst the membrane. Gases released from bottle 18 then proceed along passage 11 to impinge upon forcing member 40. Under the influence of the released gases, forcing member 40 moves in the direction of arrow "A", exerting pressure on flowable material 51 stored in cavity 49. As pressure within cavity 49 increases, the tape seal over opening 53 is ruptured, thereby enabling flowable material 51 to flow out of opening 53 under the pressure exerted by forcing member 40.

As forcing member 40 moves along passage 11, the sliding action of the forcing member 40 exposes gas exit orifices 54 to the released gas, thereby permitting release of the gas therethrough. In the embodiment shown in FIGS. 1-10, and as seen in particular in FIGS. 1-2, only a relatively small portion of each of orifices 54 is initially open to permit a flow of gas therethrough. Thus, the flow of gas from passage 11 through orifice(s) 54 is partially blocked by forcing member 40 prior to activation of the gas generating system. As forcing member 40 moves gradually (FIGS. 6, 8, and 10) along passage 11 under the influence of pressure exerted by fluid from bottle 18, a greater and greater area of each orifice 54 is opened to the gas, thereby providing a greater open orifice area through which the gas can flow out of housing 12, and enabling an increased gas flow rate from the housing.

In the embodiment described above, because only a portion of each gas exit orifice 54 (rather than the entire orifice) is opened initially to permit gas flow from housing 12, the initial release of gas from housing 12 is attenuated or moderated, thereby reducing the likelihood of damage to an inflatable element (for example, an airbag) operatively coupled to the gas generating system. The moderated gas flow also reduces the likelihood of damage to portions of the vehicle and the likelihood of injury to passengers resulting from overly aggressive airbag deployment.

Referring to FIGS. 11-14, in an alternative embodiment 108 of the gas generating system, forcing member 140*b* is formed by a portion of a cup-shaped frangible seal 140 which is secured to a housing 112. Seal 140 has a score or slit (not shown) along at least a portion thereof to provide a predetermined failure region along the seal adjacent an igniter 66 (described below) positioned within, or in fluid communication with the interior of, housing 112 for fracturing seal 140. A connecting passage 113 in communication with passage 111 is formed in housing 112 to enable fluid communication between passage 111 the igniter 66.

Igniter 66 is positioned in relation to housing 112 so as to enable fluid communication with seal 140 upon activation of the gas generating system. In the embodiment shown, igniter 66 is crimped or otherwise suitably secured to the periphery of housing 112 and extends through a wall of the housing so that, upon activation of the igniter, the igniter enters into fluid communication with passage 111 via connecting passage 113. It may be seen that igniter 66 is spaced apart from seal 140 and is positioned such that by-products resulting from activation of the igniter impinge upon the scored or prefractured region of seal 140 when the igniter is activated. One example of an igniter suitable for the application described herein is disclosed in U.S. Pat. No. 6,009,809, incorporated herein by reference. Other igniters mountable so as to be in communication with chamber 20 may also be used.

In the embodiment shown in FIGS. 11-14, which does not include a seal similar to seal 42 shown in FIGS. 1-8, the flowable material residing in passage 111 is a material (for example, a gelatinous material) that does not easily flow under the forces to which the material is exposed prior to activation of the gas generating system.

Frangible seal 140 may be formed from any suitable material, such as a metallic material or a polymer. The material from which the seal is formed and/or the structure of the frangible seal should have sufficient strength and stiffness to prevent deformation of frangible seal forcing member 140*b* into gas exit orifices 54 during operation of the gas generating system.

Operation of the embodiment shown in FIGS. 11-14 is substantially the same as operation of the previously described embodiment. Upon a crash event, a signal from a crash sensor or accelerometer (not shown) activates igniter 66. By-products resulting from activation of the igniter impinge upon the scored region of seal 140, producing fracture of the seal into a first, static portion 140*a* and a second, moving portion 140*b*. Moving portion 140*b* serves as the forcing member, moving along passage 111 and compressing a flowable material 151 stored in a cavity 149 in the same manner as set forth in the previously described embodiment.

Alternative methods for fracturing seal 140 may be used. For instance, the methods usable for rupturing seal 22 as previously described may also be used to rupture seal 140. For example, the gas pressure inside bottle 18 may be increased by heating the gas in the bottle, through the activation of an initiator (not shown) in the bottle or by other means. Alternatively, a shock wave can be generated by an initiator or other device positioned spaced apart from the seal. This shock wave travels through the gas generating system to impinge upon the seal, rupturing the seal. Other methods for rupturing seal 140 are also contemplated.

In a particular embodiment (not shown), a seal similar to seal 42 shown in FIGS. 1-8 is formed along frangible seal 140 for preventing flow of flowable material out of passage 111 in a direction opposite the direction of travel of forcing member 140*b*. The seal may be integrally formed (as part of the structure of the frangible seal), or the backflow-preventing seal may be formed from a separate component which is attached to either a portion of the frangible seal or to the housing.

In another particular embodiment, frangible seal 140 is in contact with flowable material 149 prior to activation of the gas generating system, and need not move along passage to engage the flowable material.

While certain embodiments of the valve assembly are described herein as they might be employed to regulate flow of fluid from a gas source containing a stored gas, these embodiments not restricted to such applications. Thus, the embodiments described herein may used or adapted to control the flow of gas from any other suitable gas source. For example, any of the embodiments described herein can be adapted and employed to regulate gas flow from a gas source which generates gas pyrotechnically.

Figure 15:
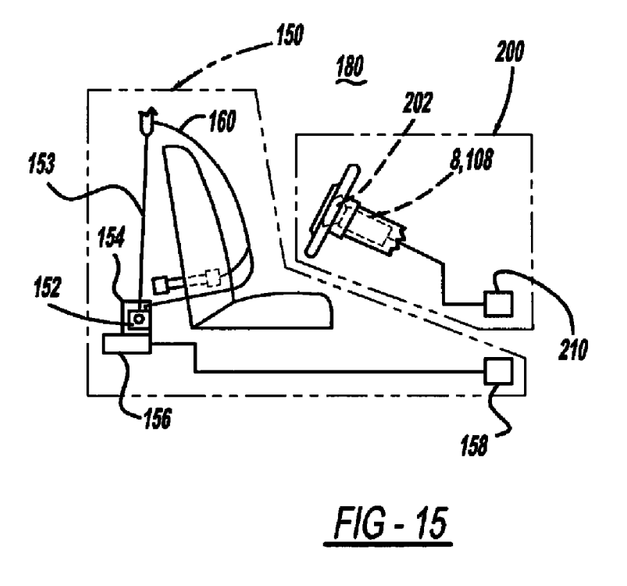
FIG. 15 is a schematic view of an airbag system and a vehicle occupant protection system incorporating a gas generating system including a valve assembly in accordance with embodiments of the present invention.

Any embodiment of the gas generating system described herein may be incorporated into an airbag system 200, as seen in FIG. 15. Airbag system 200 includes at least one airbag 202 and a gas generating system 8, 108 as described herein coupled to airbag 202 so as to enable fluid communication with an interior of the airbag. Airbag system 200 may also incorporate (or be in operative communication with) a crash event sensor 210 including a known crash sensor algorithm that signals actuation of airbag system 200 via, for example, activation of igniter 66 (not shown in FIG. 15) or activation of a mechanism for increasing the pressure within bottle 18 to rupture membrane 22 in the event of a collision.

Referring again to FIG. 15, an embodiment of the gas generating system or an airbag system including an embodiment of the gas generating system may be incorporated into a broader, more comprehensive vehicle occupant restraint system 180 including additional elements such as a safety belt assembly. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may incorporate (or be in operative communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A gas generating system comprising:
    a housing having a passage;
    a forcing member positioned in the passage; and
    a flowable material positioned in the passage to resist motion of the forcing member, wherein the flowable material flows out of the housing responsive to a force exerted on the forcing member by a gas, and wherein the forcing member divides the passage into a first portion and a second portion, the flowable material is positioned in the first portion of the passage, and wherein the gas generating system further comprises a seal for preventing flow of flowable material from the first portion to the second portion.

2. The gas generating system of claim 1 further comprising an opening formed in the housing to enable fluid communication between the first portion and an exterior of the first portion, through which flowable material is forced out of the first portion responsive to pressure exerted on the flowable material by the forcing member.

3. The gas generating system of claim 1 wherein the seal is coupled to the forcing member so as to move in conjunction with the forcing member.

4. The gas generating system of claim 1 wherein the first portion has a first volume prior to activation of the gas generating system, and wherein the flowable material occupies a second volume less than the first volume.

5. A gas generating system comprising:
    a gas source;
    a valve assembly for regulating a gas flow from the gas source, the valve assembly including:
    a housing having a passage and at least one gas exit opening formed in the housing along the passage to enable fluid communication between the passage and an exterior of the housing;
    the housing being coupled to the gas source so as to enable fluid communication between the gas source and the passage;
    a forcing member positioned in the passage to form a cavity between the forcing member and the housing and to at least partially block a flow of gas through the at least one gas exit opening, the member being movable along the passage responsive to a flow of gas from the gas source;
    a flowable material positioned in the cavity to resist motion of the forcing member responsive to the flow of gas; and
    a seal formed between the housing and the forcing member to prevent flow of flowable material, out of the cavity.

6. The gas generating system of claim 5 wherein the flow of gas is in a first direction and wherein the seal is adapted to prevent the flow of flowable material in a second direction substantially opposite the first direction.

7. A gas generating system comprising:
    a housing defining a passage;
    a frangible seal coupled to the housing and adapted to prevent a flow of gas along the passage;
    a flowable material positioned in the passage; and
    means for fracturing the seal to form a first seal portion and a second seal portion, thereby releasing gas into the passage
    wherein the released gas exerts a force on the second seal portion which is transmitted, via the second seal portion, to the flowable material to force the flowable material to flow out of the housing.

8. A vehicle occupant protection system comprising a gas generating system in accordance with claim 1.

9. An airbag system comprising a gas generating system in accordance with claim 1.

10. A gas generating system comprising:
    a housing having a passage;
    a forcing member positioned in the passage; and
    a flowable material positioned in the passage to resist motion of the forcing member, wherein the flowable material flows out of the housing responsive only to a motion of the forcing member,
    wherein a viscosity of the flowable material varies inversely with a temperature of the flowable material, and wherein the forcing member is configured to facilitate transmission of heat therethrough from the gas to the flowable material.

* * * * *

UNITED STATES PATENT AND TRADEMARK OFFICE
CERTIFICATE OF CORRECTION

PATENT NO. : 7,857,345 B1  
APPLICATION NO. : 12/217646  
DATED : December 28, 2010  
INVENTOR(S) : Stevens Page 1 of 1

It is certified that error appears in the above-identified patent and that said Letters Patent is hereby corrected as shown below:

Column 6, Line 63; Insert --be-- after may.

Signed and Sealed this
Nineteenth Day of April, 2011

David J. Kappos
*Director of the United States Patent and Trademark Office*